United States Patent [19]
McKay

[11] Patent Number: 4,476,938
[45] Date of Patent: Oct. 16, 1984

[54] AERATING MEANS

[76] Inventor: Leon A. McKay, 701 Fairfield Cir., Dunn, N.C. 28334

[21] Appl. No.: 406,281

[22] Filed: Aug. 9, 1982

Related U.S. Application Data

[63] Continuation-in-part of Ser. No. 087,658, Oct. 24, 1979, abandoned.

[51] Int. Cl.³ ............................................. A01B 45/02
[52] U.S. Cl. .................................................. 172/22
[58] Field of Search ................ 172/21, 22; 111/89–91, 111/99, 2, 6; 175/108; 212/189; 254/227, 263; 280/766.1; 408/98

[56] References Cited

U.S. PATENT DOCUMENTS

| | | | |
|---|---|---|---|
| 961,074 | 6/1910 | Hart | 254/263 |
| 1,965,177 | 7/1934 | Finkl | 172/21 |
| 2,067,781 | 1/1937 | Mueller | 172/22 |
| 2,347,748 | 5/1944 | Melling | 172/21 |
| 2,796,233 | 6/1957 | Stanford | 254/263 X |
| 3,062,385 | 11/1962 | Thompson | 280/766.1 |
| 3,109,393 | 11/1963 | Dion | 172/22 X |
| 3,193,110 | 7/1965 | Bamford | 280/766.1 |
| 3,429,378 | 2/1969 | Mascaro | 172/22 |
| 3,566,973 | 3/1971 | Blair | 172/21 |

FOREIGN PATENT DOCUMENTS 435406  9/1935  United Kingdom ................. 172/21

*Primary Examiner*—Paul E. Shapiro
*Attorney, Agent, or Firm*—Mills and Coats

[57] ABSTRACT

This invention is an aerating device particularly suitable for use in connection with golf course greens and similar applications. The device is adapted to be pulled behind a vehicle such as a tractor which also acts as a power source for operation of the aerator. A plurality of crank plates are orbitaly driven which in turn, through a plurality of individual crank arms, drive associated drill bits which auger out the aeration holes. A mobile frame is provided for raising and lowering a drilling apparatus when in use. In a modification of the present invention, a self-propelled vehicle is used to both transport and power the aerating system.

6 Claims, 7 Drawing Figures

AERATING MEANS

This is a continuation-in-part of co-pending U.S. patent application Ser. No. 087,658, filed Oct. 24, 1979, entitled "AERATING MEANS", now abandoned.

FIELD OF INVENTION

This invention relates to agricultural devices and more particularly to means for aerating soil.

BACKGROUND OF INVENTION

Since man first began cultivating the earth it has been known that breaking the same up not only loosens the soil but also aerates the same, adding nitrogen and other essential nutrients. In cropland and gardens which are replanted periodically, the aeration process occurs naturally during breaking of the soil and is of no great concern. In areas such as the lawns, golf courses, cemeteries and the like, aeration becomes a problem since they obviously cannot be plowed or broken up as cultivated land is.

Spiked rollers have been used for some of these applications even though they break some root structures as the spikes go in angley in one direction and come out in the other. Lawn type turf are usually not cut as short as finely manicured areas such as golf course greens and, therefore, receive greater benefit than detriment in the spike rolling process. In finely cultivated areas such as golf course greens, however, the aeration process becomes more difficult to accomplish.

Since aeration spikes outwardly projecting from the periphery of a roller type device causes a ripping effect, these are completely unsuitable for green use. Devices to punch aeration holes are slow and laborious if done by hand and attempts at mechanical accomplishment has not been found satisfactory since small units are time consuming and larger units damage the green itself because of weight and reciprocating motion.

SUMMARY OF INVENTION

After much research and study into the above-mentioned problems, the present invention has been developed to provide a means for aerating the soil of finely cultivated areas without adversely affecting the surface thereof. No ragged, ripping or tearing is done and relatively large areas can be aerated in a single penetrating motion. The present invention is particularly suitable for use in conjunction with golf course greens which, because of the way they are constructed, require special care to maintain and yet cannot be restricted to use by golfers for any appreciable amount of time.

To accomplish the above, a frame is provided with a plurality of drill type bits rotatively mounted thereon. These bits are turned in unison as the frame is lowered to the surface being aerated. Much deeper penetration can be accomplished than punch aeration with no packing adjacent the aeration hole. Also no ripping or tearing of the soil or grass growing therein occurs and only a small "ant hill" type mound of soil residue is left about each perforation. This residue can be easily scattered over the surface of the ground and because of its relatively fine texture, it will quickly filter down into the grass leaving no evidence of the aeration process having occurred.

In view of the above, it is an object of the present invention to provide an aeration device for aerating the soil that does not rip, tear or otherwise mutilate the same.

Another object of the present invention is to provide a soil aerating device which eliminates packing of the earth around the opening formed therein.

Another object of the present invention is to provide a means for aerating relatively large areas in a single penetrating motion.

Another object of the present invention is to provide means for driving a plurality of earth penetrating aeration means without creating operational vibration therein.

Another object of the present invention is to provide an aerating device for finely cultivated areas which can be attached to and driven by a tractor type vehicle.

Another object of the present invention is to provide a golf course green type aerating device which does not damage the playing surface thereof.

Another object of the present invention is to provide an aerating means which can be used on golf course type finely cultivated areas without indenting or otherwise damaging the playing surface thereof.

Another object of the present invention is to provide an improved drive means for earth penetrating aeration bits.

Another object of the present invention is to provide means for rotating a plurality of drill bits through interconnection of the same to a swivel plate type device.

Another object of the present invention is to provide a means for driving a plurality of aerating bits through the employment of a plurality of swivel plate type devices counter rotated one relative to the other.

Another object of the present invention is to provide a soil aerating device in the form of a twist drill type bit.

Other objects and advantages of the present invention will become apparent and obvious from a study of the following description and accompanying drawings which are merely illustrative of such invention.

DETAILED DESCRIPTION OF PREFERRED EMBODIMENT

Figure 2:
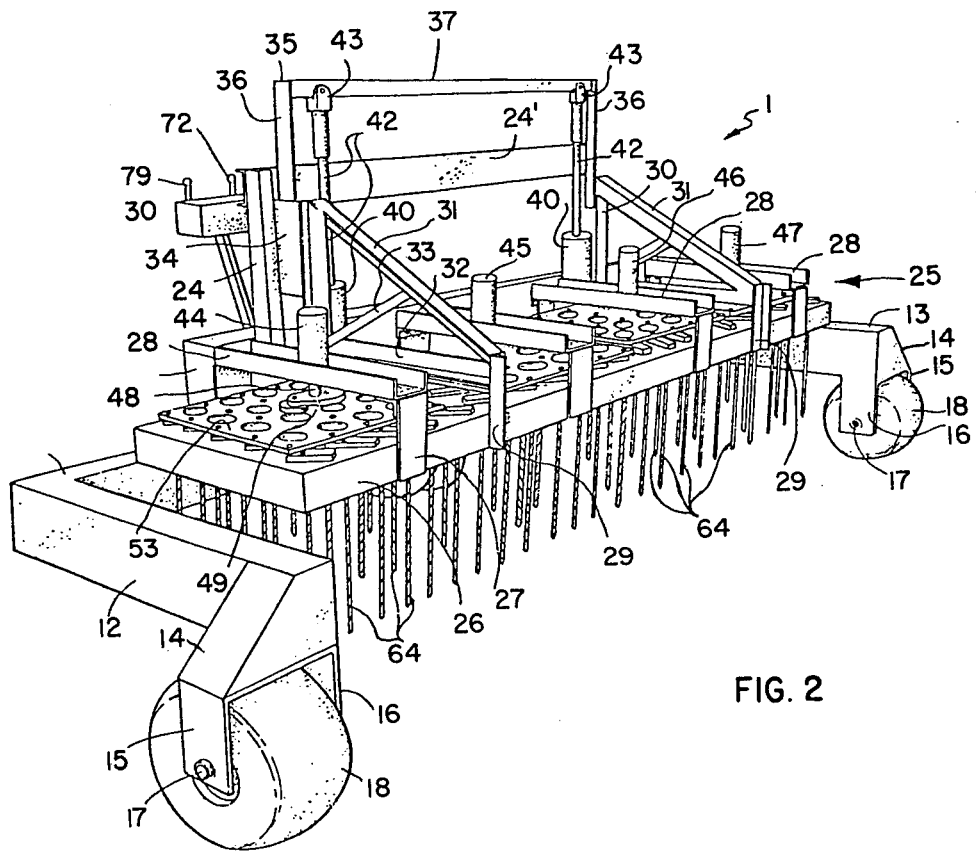
FIG. 2 is an enlarged rear perspective view of such device.

With further reference to the drawings, the aeration device of the present invention, indicated generally at 1, includes a mobile frame, indicated generally at 10, composed of a cross member 11 fixedly secured to arm members 12 and 13 disposed perpendicular thereto on opposite ends thereof to form a generally U-shaped configuration.

At the outer ends of each of the arm members 12 and 13 is an outwardly disposed gusset 14 having downwardly projecting flanges 15 and 16 fixedly secured thereto. An axle bolt 17 extends between the lower ends of each set of these flanges and rotatively supports a wheel 18. These wheels are preferably of the baloon type to distribute the weight of the means of the present invention when on a golf green or other finely cultivated area so as not to depress or otherwise damage the surface thereof.

Fixedly secured to the forward central portion of cross frame 11 is an outwardly extending bracket 19. Swively connected to bracket 19 are a pair of wheels 20 rotatively mounted on axle 21. A draw bar 22 is connected to swivel wheels 20 thus providing a tow means similar to the tow bars used in connection with the forward gear of tricycle geared aircraft to allow the same to be moved by a tow tractor. Since the details of swivel wheels and draw bars of this type are well known to those skilled in the art, further discussion of the structure thereof is not deemed necessary.

From the above, it can be seen that a towable tricycle type frame 10 for aerating device 1 of the present invention is provided.

Mounted on the upper central portion of cross frame 11 is a hydraulic reservoir 23. For clarity of illustration, the various hydraulic lines going to the hydraulic reservoir, the hydraulic cylinders, the hydraulic motors, etc., have not been illustrated in the perspective views but are included in the hydraulic schematic of FIG. 5. Since it would be obvious to one skilled in the art to connect the controls, motors, cylinders, etc., of the perspective views by following the schematic of FIG. 5, such "plumbing" has not been shown in the perspective as they would so clutter the same that the other details of the present invention could not be adequately illustrated.

Fixedly secured by weldment or other means to the interior vertical edge of box beam type cross member 11 are a pair of upright channel members 24 which are adapted to slidingly receive the drill carriage indicated generally at 25. This carriage includes an elongated, rectangular, box shaped drill frame 26.

A plurality of uprightly disposed flanges 27 are fixedly secured to frame 26 in pairs on opposite sides thereof. The upper end of these pair flanges are fixedly secured to a motor support channel 28.

To the rear edge, as oriented in the drawings, of the box like drill frame 26 is a short upright support 29. To the front or forward edge of drill frame 26 is a relatively long lift support 30 disposed in general alignment with upright channel 24 of the frame 10. Extending between and fixedly secured by weldment or other means to the upper portion of each of the opposed short and long lift supports is a diagonal cross brace 31. A horizontal cross brace 32 is also disposed between and fixedly secured to the opposed lift supports 29 and 30 as can clearly be seen in FIGS. 2 and 3.

To add additional frigidity to the lift portion of the invention, a stiff knee 33 is provided which extends from the central portion of diagonal brace 31 to the apex of horizontal brace 32 and long support 30.

A lift plate 34 is fixedly secured by weldment or other means to each of the long lift supports 30. A generally U-shaped lift frame 35 is provided which includes upright portions 36 and a central portion 37. The lower end of each of the upright portions 36 is secured by bolting, weldment or otherwise to its respective lift plate 34.

A plurality of guide rollers 38 are rotatively mounted on bolt like axles 39. These guides are adapted to be rollingly disposed within adjacent channel members 24 of frame 10 as can clearly be seen in FIG. 3.

The lower end of double acting hydraulic cylinders 40 are fixedly mounted on the interior or rear portion of cross member 11 by means such as bracket 41. The piston rod 42 of each cylinders 40 has a generally U-shaped mount 43 on the end thereof which is secured by a pin 43' or other suitable means to the central portion 37 of lift frame 35.

Thus it can be seen that when the hydraulic cylinders 41 are activated, they will move drill carriage 25 up and down relative to support frame 10.

A hydraulic motor is operatively mounted on the central portion of each of the motor support channels 28 and are indicated by the numbers 44, 45, 46 and 47. Each of these motors have an output or drive shaft 48 which has a crank arm 49 fixedly secured thereto. Each of these crank arms include a counter balance portion 52 opposite a drive pin 51. The lower end of this pin (as oriented in the drawings) is rotatively mounted within bearing block 52 which is fixedly secured to the central portion of a generally rectangular swivel plate 53. To reduce the weight of the swivel plate 53, a plurality of openings 54 are formed therein.

Disposed in a geometric or grid pattern in swivel plate 23 are a plurality of bearing openings 55 which are adapted to rotatively receive pivot pins 56. Each of these pivot pins 56 is mounted in one end of a drill crank 57. Each of these cranks has a drill drive shaft fixedly secured to the central portion thereof and extends outwardly to form a counter balance portion 59.

Figure 4:
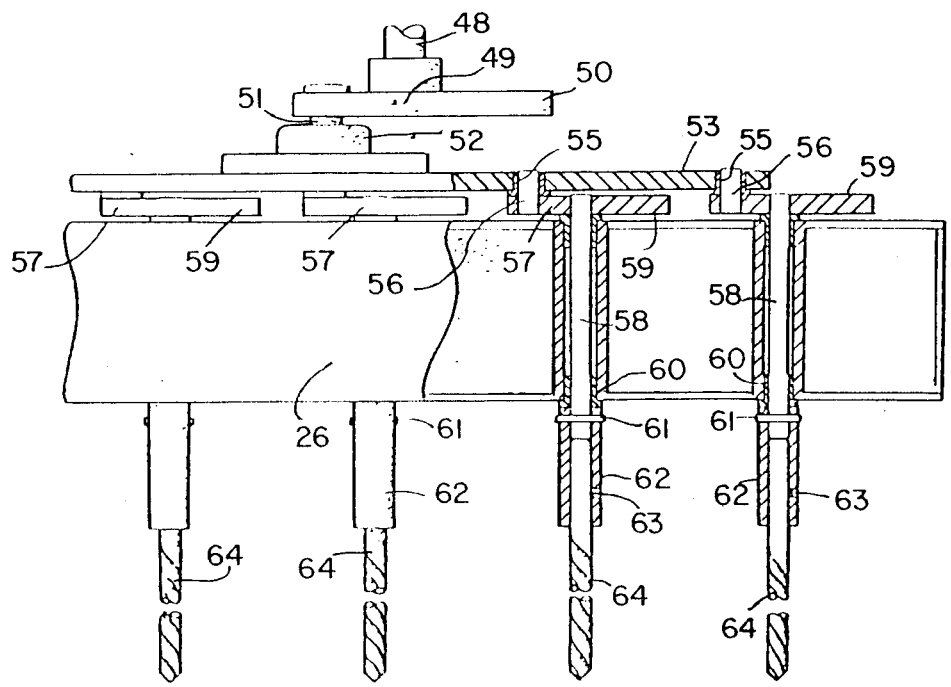
FIG. 4 is a partially cutaway side elevational view of the drill means and its drive mechanism.

Sleeve bearings 60 rotatively mount each of the drive shafts 58 through box like drill frame 26 as can be seen clearly in the partial cutaway of FIG. 4.

A pin 61 fixedly mounts drill chuck 62 to the lower end of shaft 58. A set screw or similar means 63 is used to retain each of the drill bits 64 within respective drill chucks 62.

A control mounting arm 65 is fixedly secured at one end to draw bar 22 and has mounted on its other end control 66. This control includes a plurality of control levers as will hereinafter be described in further detail.

From the above, it can be seen that when the motors 44 through 47 are activated to drive the respective drive shafts 48, the swivel plates 53 will be caused to move or swivel orbitly which in turn transfers rotative movement through drive shaft 58 to the drill bits 64 associated therewith.

Figure 5:
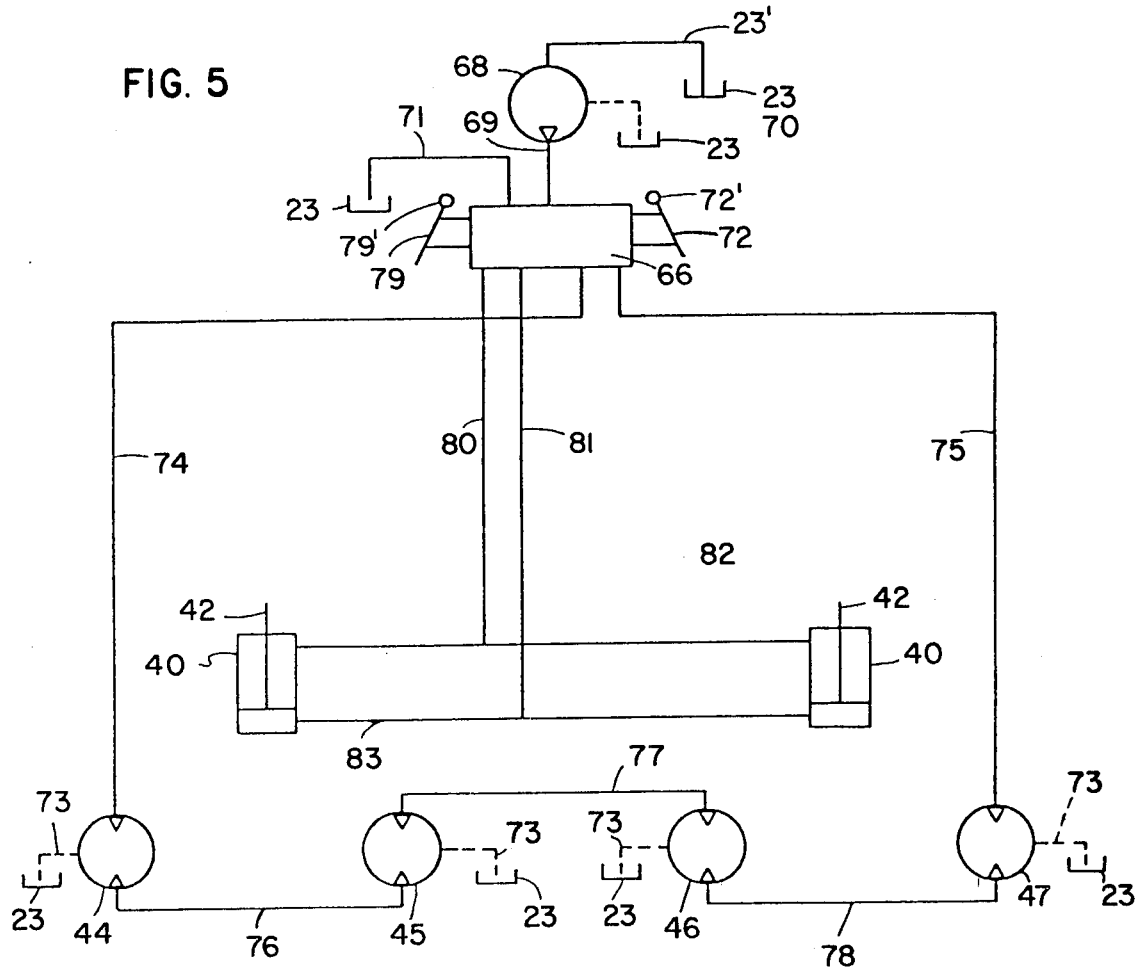
FIG. 5 is a schematic view of the hydraulic control system of the invention.

A standard drive means such as the power takeoff (not shown) of tractor 67 can be used to drive the hydraulic pump 67 shown in the schematic of FIG. 5. This pump, of course, obtains its operating fluid through line 23' from reservoir 23 and is connected through line 69 into control 66. A relief line 70 is also provided for pump 68 in the normal fashion. A relief line 71 is additionally provided for control 66, again as is standard practice in the hydraulic art.

Control lever 72 manipulated by knob 72' controls the direction of fluid flow through hydraulic motors 44, 45, 46 and 47. It should be noted first that these motors are reversible and secondly that each, alternatively, is driven in a different direction. The purpose of this last feature is to counter balance the torque of the device of the present invention when in operation so that smooth downward motion can be accomplished. Also each of these motors includes a relief line 73 as is standard practice for such devices.

Lines 74 and 75 connect control 66 to motors 44 and 47 with intermediate lines 76, 77 and 78 connecting motors 45 and 46 in series therewith.

Control levers 79 with its associated knob 79' controls of flow of fluid from control 66 through lines 80 and 81. These lines are teed into lines 82 and 83, respectively, which are operatively connected to double acting hydraulic cylinders 40 in parallel.

From the above, it can be seen that through the manipulation of control handle 72, motors 44 through 47 can be driven in one direction or the other. Likewise, through manipulation of control lever 79, piston rods 42 can be moved selectively up and down.

To use the aerating means of the present invention, the tractor 67 is operatively connected to draw bar 22 by means such as pin 22'. Hydraulic pump 68 is then operatively connected to the power take off of the tractor or to other suitable drive means. The aerating means of the present invention can now be moved to the location at which it will be used.

Control lever 72 is activated for proper rotation of motors 44 through 47 to cause drill bits 64 to rotate in the appropriate drilling direction. Control handle 79 can now be activated to cause cylinder 42 to retract cylinder rods 42 thus forcing lift frame 35 downwardly to move the drill carriage 25 in the same direction. This operation is accomplished smoothly due to rollers 38 operatively mounted within channel members 24 of frame portion 10.

As motors 44 through 47 begin to rotate, the various drive shafts 48 drive arms 49 to cause swivel plate 53 to orbitally rotate. This orbital movement, through pivot pins 56 and cranks 57, rotatively drive drill bits 64.

As lever control 79 is manipulated, drill carriage 25 will move downwardly as discussed above causing drill bits 64 to engage the earth below. The increment and speed of the downward movement is coordinated with the conditions encountered such as hardness of the ground, the sharpness of the bits, etc., and such downward pressure is maintained until the desired depth is reached. Control lever 79 can then be reversed to cause cylinders 40 to raise the drill carriage 25 until bits 64 are clear of the earth. The aerating device 1 can then be moved to the next drilling location (usually adjacent the one just completed) and the process repeated until the entire area to be aerated has been so processed.

Figure 1:
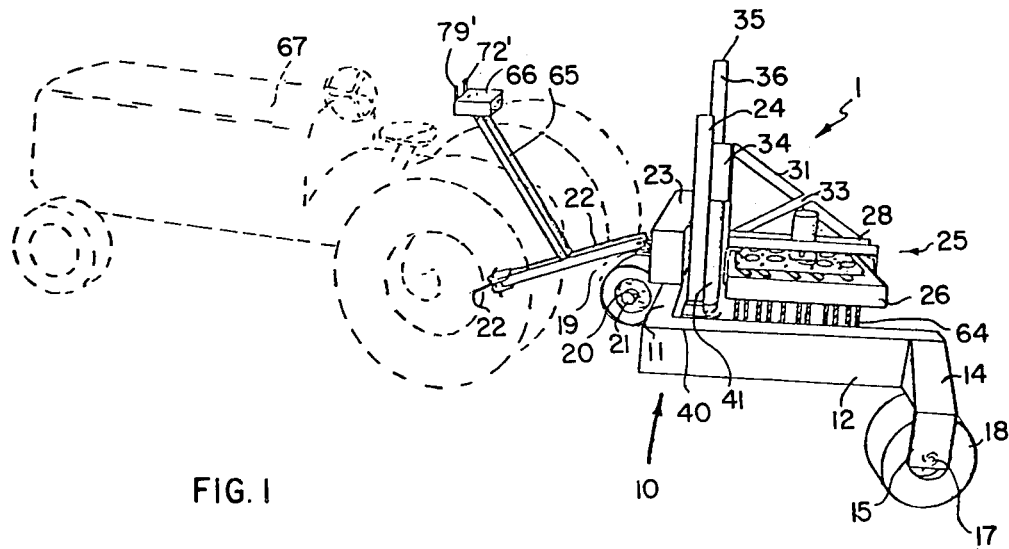
FIG. 1 is a perspective view of the aeration device of the present invention in operative relationship to a tractor type towing vehicle.
Figure 3:
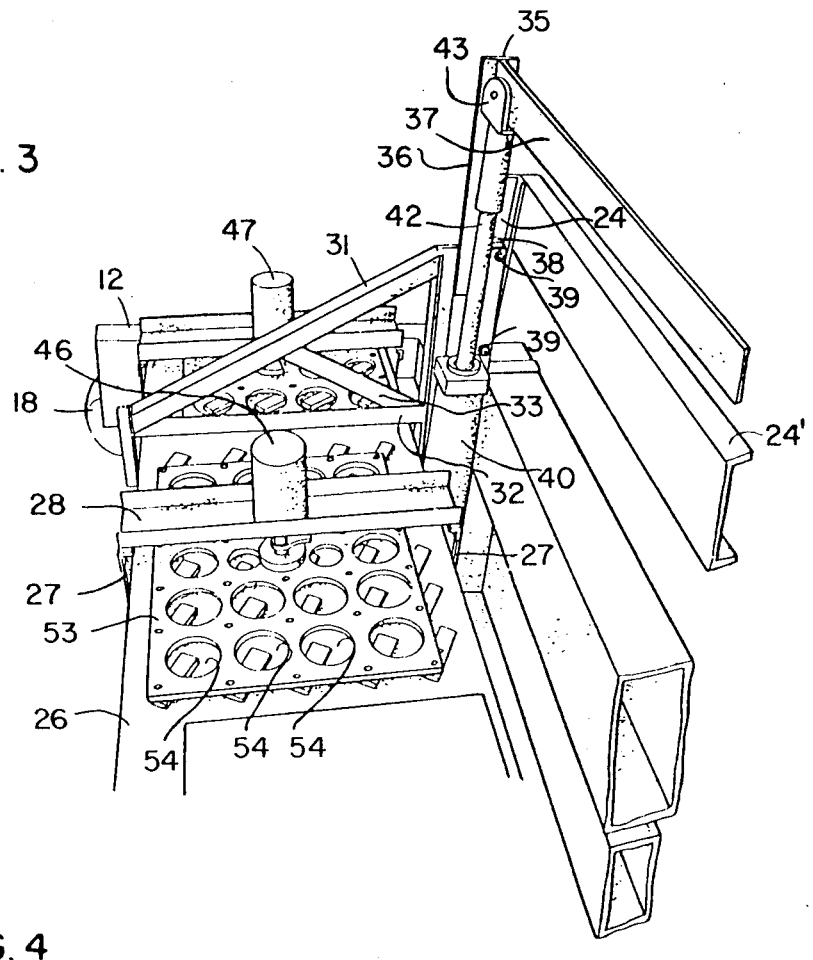
FIG. 3 is a partially cutaway top perspective view of the same.
Figure 6:
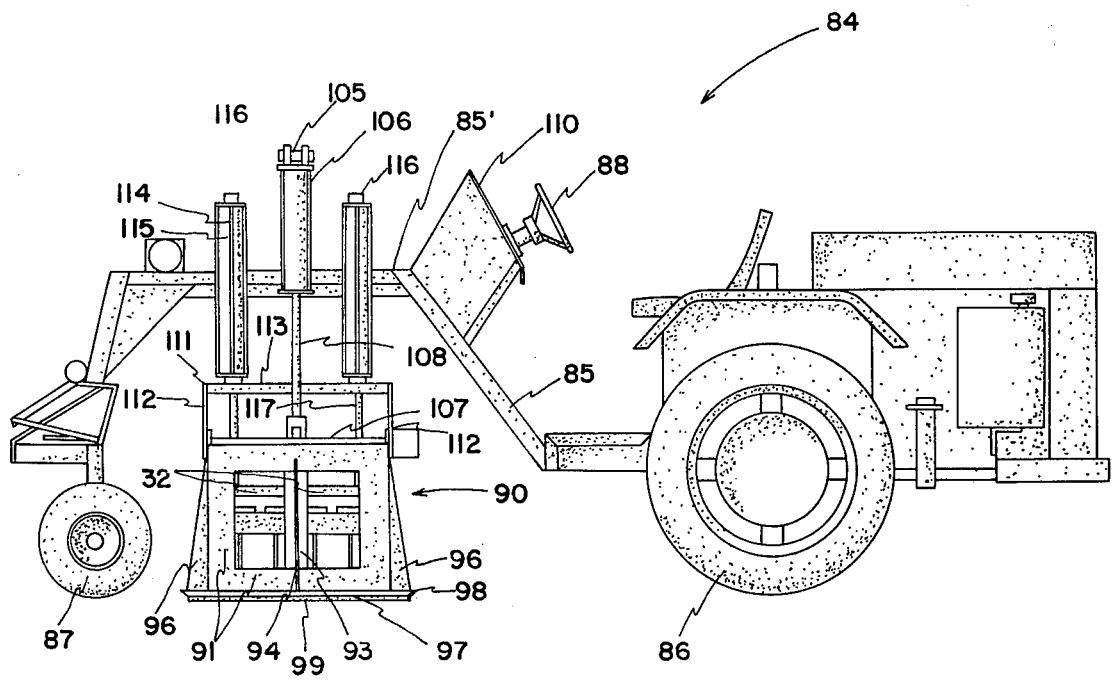
FIG. 6 is a side elevational view of a modification of the present invention wherein the aerating means is mounted on a tractor type vehicle.
Figure 7:
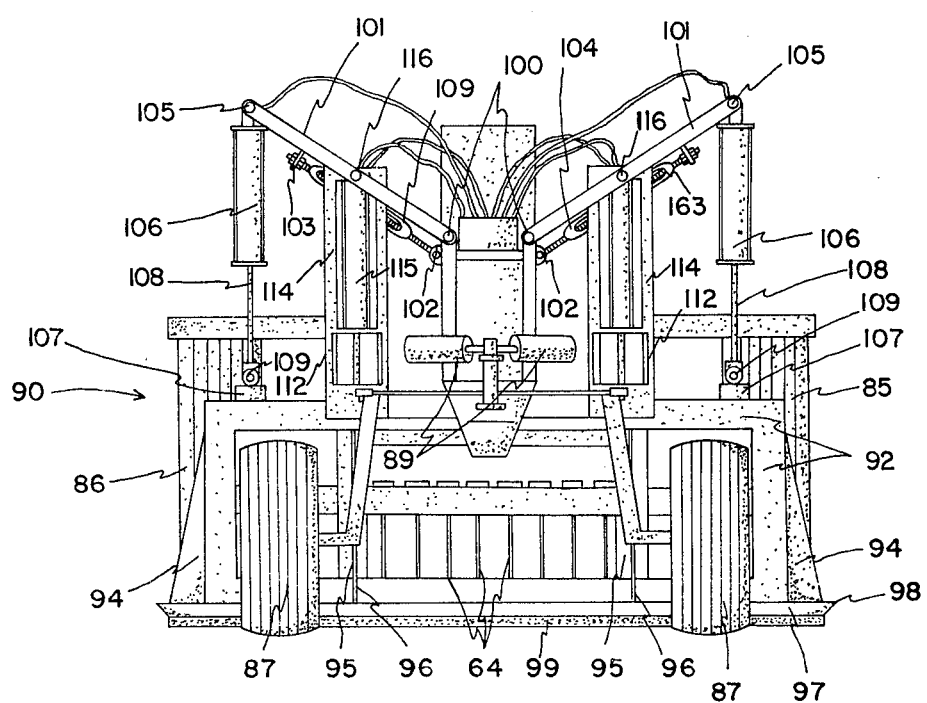
FIG. 7 is a front elevational view of such modification.

In the modified aerating means shown in FIGS. 6 and 7, the drill carriage, indicated generally at 25, is the same as that disclosed in FIGS. 1 and 2 and operates the same through use of hydraulic motors 44, which through intermediate linkages, drive drill bits 64. In the modification, however, lift supports 29 and 30 and their associated structure including double acting hydraulic lift cylinders 40 are not used but substitute lifts and driving cylinders 115 along with associated mounting structure are provided as will hereinafter be set forth in detail.

The modification includes a self-propelled support vehicle, indicated generally at 84, which has a humped shape frame 85. On the rear portion of this frame is mounted an engine 86 for propelling the support vehicle 84 through drive wheels 86' as well as providing a power source for the hydraulic system of the present invention. Since mechanical systems of this type are well known to those skilled in the art, further detailed description of the same is not deemed necessary.

In addition to drive wheels 86', hydraulically steerable front wheels 87 are provided on the opposite side of the hump portion 85' of frame 85.

Through the manipulation of steering wheel 88, cylinders 89 are controlled which in turn, through mechanical linkages, turn front wheels 87 back and forth. Since steering systems of this type are well known to those skilled in the art, further detailed description of the same is not deemed necessary.

A presser skirt, indicated generally at 90, is mounted below the hump portion 85' of frame 85 and is composed of rectangular end frames 91 and rectangular side frames 92 secured together by weldment or other methods to form a box-like enclosure. Each of the end frames 91 has an intermediate frame 93 secured thereto with a reinforcing gusset 95 outwardly disposed therefrom. A pair of intermediate frames 95 are provided on side frame 92 with reinforcing gussets 96 welded or otherwise secured thereto.

Outwardly extending about the lower periphery of presser skirt 90 is a generally flat presser foot 97. This foot is reinforced by end gussets 94 and side gussets 96 and is slightly upturned at its outer edge 98 to prevent permanent marks from being left on the green or other surface being aerated.

On the lower or bottom surface of presser foot 97 is secured a presser pad 99 of foam rubber or other suitable material to further assure that no damage to the green or other surface will occur during operation of the improved aerating means of the present invention.

Pivotably mounted at hinge connection 100 on opposite sides of hump portion 85' of frame 85 are outwardly projecting presser skirt support arms 101 as can clearly be seen in FIG. 7. Below each of the hinge connections 100 is a support bracket 102 fixedly secured to the respective side of hump portion 85'. On the lower side toward the outer end of each of the support arms 101 is a support bracket 103. Extending between each set of support brackets 102 and 103 below its respective support arm 101 is a turn buckle brace arm 104. Thus it can be seen that as each of the turn buckles 104 is manipulated in the normal manner of such devices to extend or retract the same, the respective support arm 101 will be raised or lowered thus giving fine adjustment to the position of such arms.

Pivotably mounted by pin 105 at the end of each of the support arms 101 is a double acting presser skirt hydraulic cylinder 106.

Fixedly secured to and extending across the upper portion of presser skirt 90 adjacent each end thereof is a skirt support beam 107. The outermost end of the piston rods 108 of cylinders 106 are pivotably attached to beams 107 by means such as pins 109. Since pin connections of this type are well known to those skilled in the art, further detailed discussion of this feature is not deemed necessary.

From the above, it can be seen that when the control panel 110 is manipulated, double acting cylinders 106 will pull their respective rods 108 either up or down thus either raising or lowering presser skirt 90 as the case may be.

U-shaped frames 111, including end portions 112 and a top portion 113, are fixedly secured across the upper portion of presser skirt 90 and are fixedly secured thereto. A generally U-shaped hydraulic support frame 114 extends upwardly from top portion 113 of each of the U-shaped frames 111. A hydraulic cylinder 115 is mounted on each frame 114 by means such as pin 116.

The piston rods 117 of cylinders 115 operatively pass through the upper portions 113 of frames 111 and are secured to cross braces 32 of drill carriage 25.

From the above it can be seen that when control panel 110 is manipulated, cylinders 115 can move drill carriage 25 and its associated drives and drills 64 up and down within the confines of presser skirt 90 to accomplish the aerating process.

When the modified aerating means of the present invention is used, hydraulic cylinders 106 are activated to raise presser skirt 90 and its associated drill carriage 25. The support vehicle 84 can then be driven to the aerating site and stopped. The hydraulic cylinders 106 are then activated to lower presser skirt 90 and to hold presser pad 99 and its associated presser foot 97 against the ground.

Hydraulic motors 44, 45, 46 and 47 are then activated to cause the drill bits 64 of drill carriage 25 to turn. Hydraulic cylinders 115 are then activated from control panel 110 to lower the turning drill bits into contact with the ground being aerated. Continued downward pressure of cylinders 115 and their associated piston rods 117 drives the drill bits 64 into the ground as hereinabove described relative to the towed version of the present invention. Once the proper depth has been reached, either manually or through a solenoid or similar means not shown, the double acting hydraulic cylinders 115 are reversed and they withdraw the drill bits 64 from the ground.

Skirt cylinders 106 are reversed to raise the presser skirt 90 from engagement with the ground and the vehicle 84 can move the width of the drill carriage. The presser skirt is again lowered and the drill carriage with its turning bits again forced in the ground. This process is continued until the entire desired area has been aerated.

From the above, it can be seen that a smoothly operating, high efficient aerating means is provided which, because of the use of appropriate counter balances and opposed motor rotations, allows aerating holes to be drilled in the soil straight down and straight up without damaging side motion or other vibratory effects. The present invention is simple to operate, is rugged in structure and is designed to accomplish a desired result which has heretofore not been practically possible.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. An improved aerating means comprising: a support vehicle; an open, hollow, box-like presser skirt reciprocably mounted on said support vehicle and having a ground engaging presser foot mounted on the lower edge thereof and extending about its periphery; a compressable presser pad mounted on the bottom of said peripheral presser foot and extending downwardly therefrom; a carriage reciprocably mounted within said open, hollow box-like presser skirt and interiorly of said peripheral presser foot and its associated peripheral presser pad; a multiplicity of drill means rotatively mounted on said carriage means interiorly of said presser skirt and its associated peripheral presser foot and presser pad; means for reciprocating said presser skirt up and down relative to the earth; means for reciprocating said carriage means up and down relative to said presser skirt; and means for rotatively driving said drill means mounted on said carriage interiorly of said presser skirt and its associated peripheral presser foot and presser pad whereby a highly efficient aerating means is provided.

2. The aerating means of claim 1 wherein said support vehicle is self-propelled.

3. The aerating means of claim 2 wherein said support vehicle includes a hump shaped frame to which said presser skirt is reciprocatingly mounted.

4. An improved aerating means comprising: a support vehicle; a generally box-shaped presser skirt reciprocably mounted on said support vehicle by at least one height adjustable, outwardly extending support arm; a carriage means reciprocably mounted within said presser skirt; a multiplicity of drill means rotatively mounted on said carriage; means for reciprocating said presser skirt up and down relative to the earth; means for reciprocating said carriage up and down relative to said presser skirt; and means for rotatively driving said drill means mounted on said carriage whereby a highly efficient aerating means is provided.

5. The aerating means of claim 4 wherein said support vehicle is self-propelled.

6. The aerating of claim 5 wherein said support vehicle includes a hump shaped frame to which said presser skirt is reciprocatingly mounted.

* * * * *